Aug. 7, 1928.
H. E. HODGSON
PLASTIC ARTIFICIAL HAND
Filed Oct. 29, 1923     5 Sheets-Sheet 1
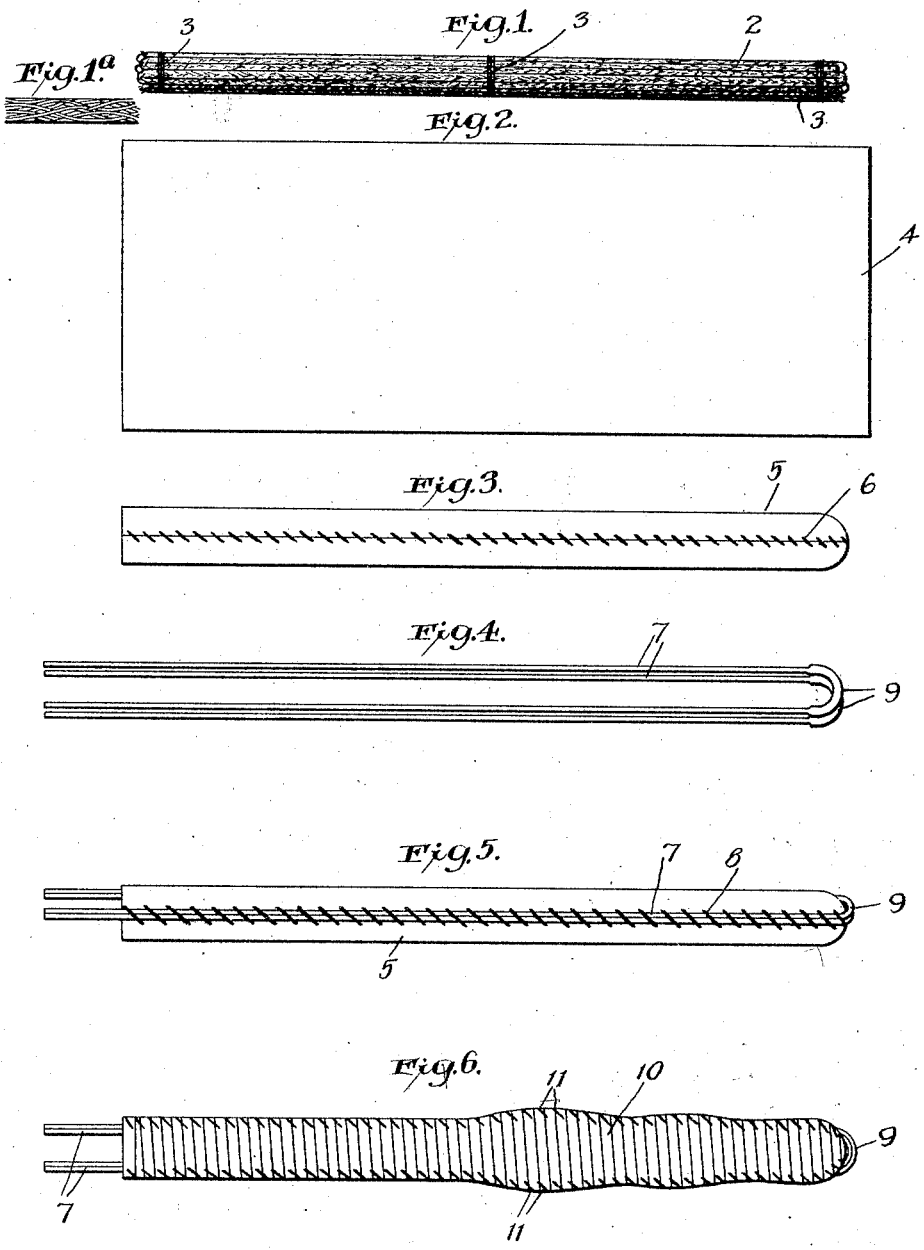
INVENTOR
Harriette E. Hodgson
BY
ATTORNEY Aug. 7, 1928.
H. E. HODGSON
PLASTIC ARTIFICIAL HAND
Filed Oct. 29, 1923
1,680,022
5 Sheets-Sheet 2
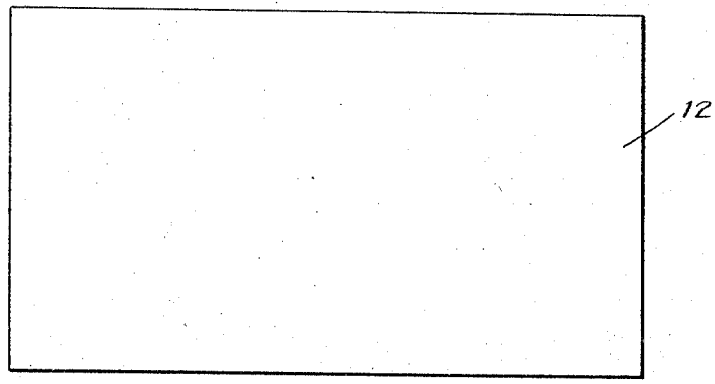
Fig. 7.
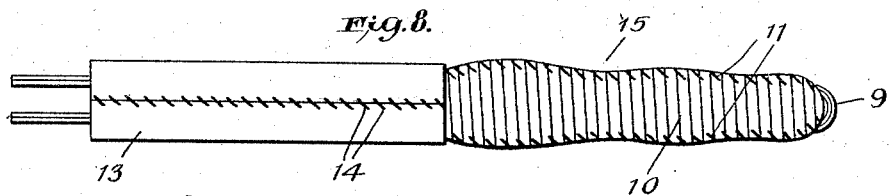
Fig. 8.
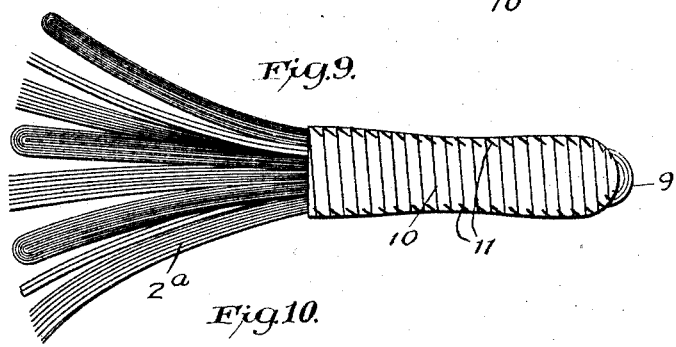
Fig. 9.
Fig. 10.
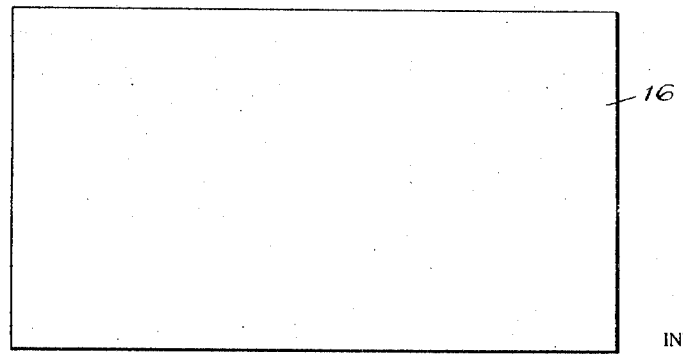
INVENTOR
Harriette E. Hodgson
BY
ATTORNEY Aug. 7, 1928.
H. E. HODGSON
1,680,022
PLASTIC ARTIFICIAL HAND
Filed Oct. 29, 1923    5 Sheets-Sheet 3
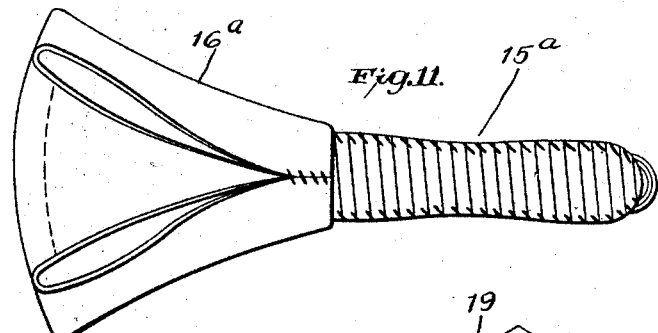
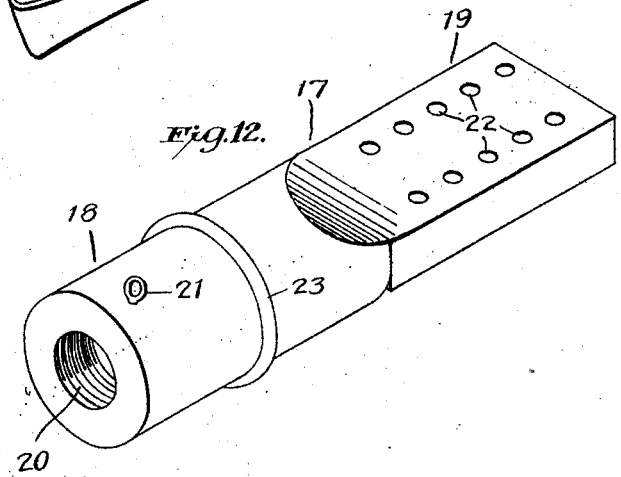
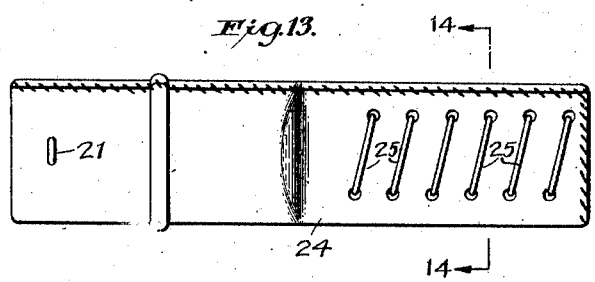
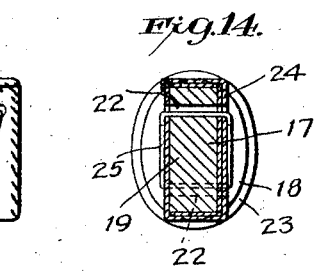
INVENTOR
Harriette E. Hodgson
BY
ATTORNEY Aug. 7, 1928.
H. E. HODGSON
1,680,022
PLASTIC ARTIFICIAL HAND
Filed Oct. 29, 1923   5 Sheets-Sheet 4
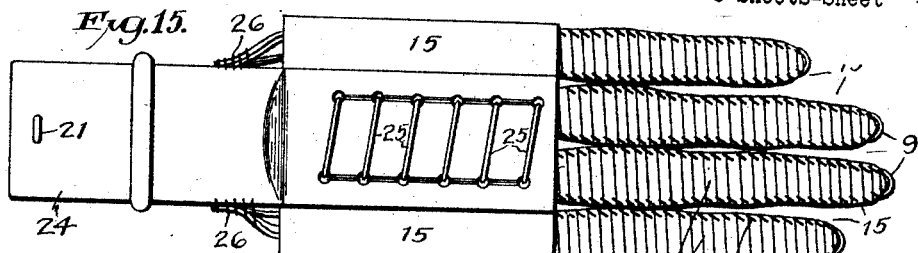
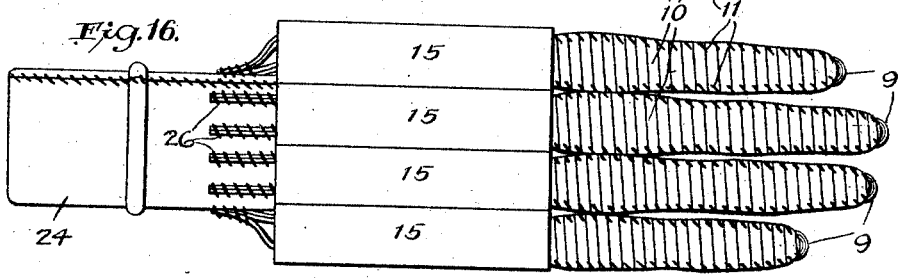
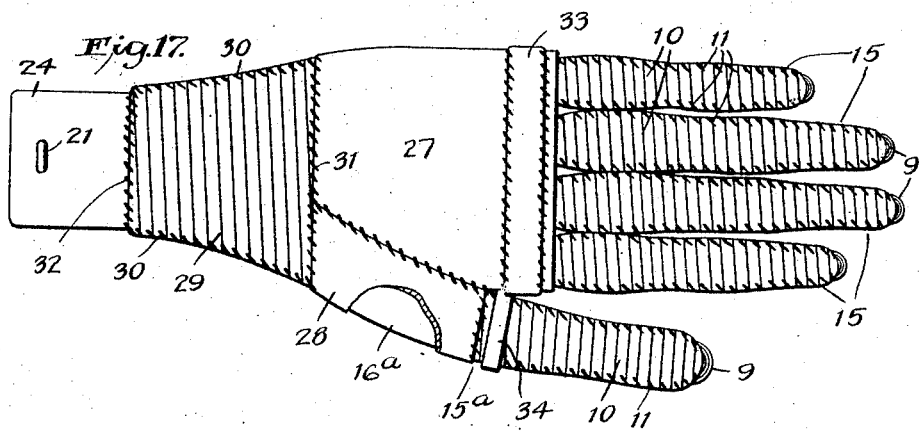
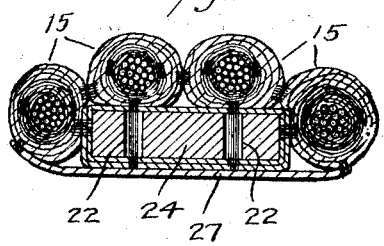
INVENTOR
Harriette E. Hodgson
BY
ATTORNEY Aug. 7, 1928.  
H. E. HODGSON  
PLASTIC ARTIFICIAL HAND  
Filed Oct. 29, 1923   5 Sheets-Sheet 5

1,680,022

INVENTOR  
Harriette E. Hodgson  
BY  
ATTORNEY

Patented Aug. 7, 1928.

1,680,022

UNITED STATES PATENT OFFICE.

HARRIETTE E. HODGSON, OF NEW YORK, N. Y.

PLASTIC ARTIFICIAL HAND.

Application filed October 29, 1923. Serial No. 671,489.

The invention relates to a plastic artificial hand for personal use. My aim has been to provide an artificial hand which is to a high degree serviceable, durable, and natural, which can be made cheaply, of readily obtainable materials, and can be repaired by household methods, and which is not dependent upon mechanism. A great variety of mechanical hands have been devised, but these, however ingenious, are far removed from the natural hand and afford little satisfaction psychologically, besides being expensive and liable to derangement, calling for expert attention to put them in order again.

The object in the present hand is, therefore, to simulate closely the natural hand in appearance and in feel and action when grasped, at the same time giving its members strength, with flexibility, for performing useful work. The fingers can be crooked or straightened, separated or brought together in any desired natural position, and will hold their positions with firmness, and the hand as a whole, inside a glove, has the feel of a compressible, slightly cushiony, fleshy substance over a lifelike bony structure.

In the accompanying drawings, forming part hereof:

Fig. 1 shows a bundle of pliant, tenacious strands such as I prefer to use for the core of one of the finger members;

Fig. 1ª is an enlarged view of one of the individual strands of Fig. 1;

Fig. 2 is a plan view of a sheet of filling material, to be wrapped as a sheath around the core;

Fig. 3 is a view showing the sheath wrapped around the core and sewed;

Fig. 4 is a view of side reinforcing wires, joined by nail loops, which are to be applied to the assemblage of Fig. 3;

Fig. 5 shows these wires stitched to the finger member in this stage of its construction;

Fig. 6 shows the assemblage of Fig. 5 covered by a binding and shaping wrapping of heavy tape, consolidated by stitching;

Fig. 7 is a plan view of a sheet of compressible fabric to be wrapped around the metacarpal rear half of the finger member;

Fig. 8 shows this metacarpal sheath applied and stitched in position on the assemblage of Fig. 6;

Fig. 9 is a view of a thumb member, showing the strands of its metacarpal portion fanned out to form a wide winged base;

Fig. 10 is a plan view of a sheet of material to form an envelope of this base;

Fig. 11 is a view of the thumb member with the basal envelope applied;

Fig. 12 is a perspective view of a foundation block;

Fig. 13 is a plan view of the block, covered;

Fig. 14 is a cross-section on the line 14—14 of Fig. 13;

Fig. 15 is a bottom plan or palm view, showing the four finger members coresponding to the index finger, the middle finger, the ring finger, and the little finger, with their rearward metacarpal prolongations applied to the foundation block;

Fig. 16 is a top plan or back view of the same;

Fig. 17 is a bottom or palm view of the finished hand, a portion of an outer layer being torn away to indicate its presence;

Fig. 18 is a cross-section on the line 18—18 of Fig. 19;

Figure 19:
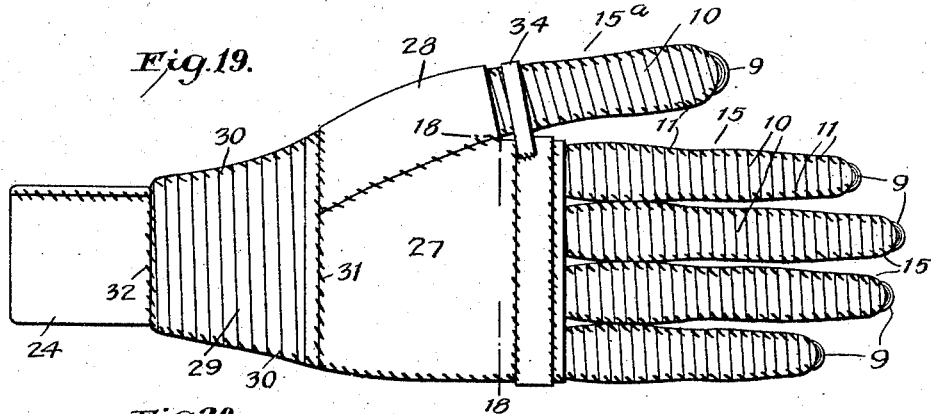
Fig. 19 is a back view of the finished hand.

Fig. 1 represents a core bundle 2 of numerous wire strands, for one of the finger members. The wire used is pliant rather than elastic, and I find that braided picture wire is especially advantageous for the purpose. Fig. 1ª represents on an enlarged scale one of the strands of such a bundle, the strand being itself composed of numerous fine interlaced filaments. A core bundle may be prepared by taking a number of such strands of considerable length, folding them as indicated to make a bundle of the desired thickness and length, and tying the strands together with some of the wire, at several points 3. In this way a very strong, substantial core, having an unlimited capacity for bending without breaking, and adapted to hold any position to which it is bent, with considerable firmness, is produced. With these ends in view, the specific form, arrangement and material of the core may be varied. The length of the core or bundle is approximately twice that of the digit to be made, so that it will extend through the digit and also substantially through the metacarpal portion of the artificial hand.

In the preferred manner of making one of the finger members, the bundle 2 is next rolled in a sheet of felt or other fabric or material 4 (Fig. 2), which is wrapped to form a continuous filling sheath 5, preferably of several thicknesses. The selection of felt is due not only to its strength but to the cushiony or flesh-like quality of the wrapping thus obtained. The sheath is sewed, as indicated at 6, to close it at the side and at the front end.

In Fig. 4 are shown some additional stiffening or core wires 7, which it is advantageous to dispose outside of the sheath 5. These wires are also of pliant metal, preferably solid rather than braided, and are moderately heavy so as to lend a substantial amount of stiffness. They are applied at the two sides of the wrapped core, so that the artificial finger will bend considerably less readily in lateral directions than it will in the sense in which the joints of a natural finger operate. The number of these wires may be varied, but I have shown two at each side, fastened to the felt by heavy stitching 8.

The stiffening wires at the two sides are continuously joined with each other by curved loops 9 at the front. These loops projecting somewhat, and flattened on top, or at top and bottom, simulate a finger nail. In some cases the nail loop might not be continuous with the side stiffeners, but the construction shown is especially advantageous for manifest reasons.

The rear ends of some of the wires, specifically the wires 7, are caused to project for anchoring purposes.

The next step in constructing the preferred embodiment of the invention is to enclose the assemblage of Fig. 5 in a heavy binding wrapping 10 of strong tape, wound spirally about the member throughout its length until the desired thickness and form are attained. This tape is wound very tightly in several thicknesses, and the resulting wrapping is sewed along the sides, at 11, so as to unite the turns of the tape with each other, to prevent slipping and to consolidate the whole mass. By varying the number of turns of tape at different regions along the member, a shaping of the artificial digit is obtained, indicated in the right-hand half of Fig. 6. In some instances the filling wrapping beneath the tape may be differently arranged, or even dispensed with, in which latter case spiral taping might form the entire filling and binding; but the combination of the two kinds of covering, with the core stands and stiffeners, is the most advantageous for wearing and tactile qualities. The covering sought is one both firm and compressible, sufficiently elastic to be shape-retaining, and well adapted for bending, besides being generally strong and durable for the purposes of an artificial hand of the kind contemplated.

The finger member may now be completed by wrapping a sheet of felt or the like 12 (Fig. 7) about its rear or metacarpal half, more or less, giving this portion additional body. This wrapping or sheath is marked 13, and the stitching which secures it is indicated at 14. It might extend the full length of the finger member, but it is sufficient and somewhat preferable to restrict it to the metacarpal extension.

In a finger member constructed substantially in the foregoing manner the core and the covering, or coverings, cooperate to secure a flexible, yet stiff and firm, structure, through which effort can be exerted, and which can be bent and used indefinitely without injury to either the core or the wrappings. Of such members a hand can be made that is natural in its poses and to the touch, and possesses a valuable suggestion of life.

The four finger members proper 15 for the hand are made in the manner described, in proper lengths and of proper contours. The thumb finger member 15ª (Figs. 9, 10, 11) is of similar construction, but the spiral wrapping 10 and the filling wrapping inside are preferably not extended rearward to cover the part of the core strands 2 which are incorporated in the metacarpus. The side stiffening wires which are continuous at the front with the nail loop also need not extend rearward beyond the digit portion of the member. The rear part 2ª of the core bundle of the thumb, which should be made heavier than the core of the other finger members, is fanned out as seen in Fig. 9, making a wide, winged base forming a sort of mat of tendons to be applied to the side, and overlapping the top and bottom, of the metacarpus which is produced by uniting the metacarpal portions of the finger members upon a suitable block, as will be described.

A sheet of felt 16 or the like (Fig. 10) is folded and sewed to form an envelope 16ª for the wires of the basal extension of the thumb member.

The foundation block 17 illustrated in Fig. 12 comprises carpal and metacarpal portions 18 and 19, the carpal or wrist portion containing a screw socket 20 so that the hand may be screwed on and off a screw projection on the artificial arm or stump. An eye 21 may also be provided on this part, for engagement by a locking device, such as the hasp hook of my Patent No. 1,468,861 of September 25, 1923, to prevent possible swiveling of the hand upon its screw. The block, which is preferably of aluminum or other light, strong material, is flattened in its metacarpal portion and provided with longitudinal rows of holes 22 extending through from top to bottom. A rib or rounded ridge 23 is raised around the rear part of the block at the point where the basal wrappings of the hand are to terminate.

The block is covered at top, bottom, sides and front end with felt 24, or other strong and preferably cushiony material, which it is desirable to arrange so that there are two or more thicknesses at the sides, as shown in Fig. 14. A thread 25, preferably conspicuously colored, laced through the covering and through the holes 22 in the flattened part of the block, furnishes a guide for finding the holes in sewing on the finger members.

The rear, metacarpal halves or extensions of the four finger members 15 are applied along the metacarpal portion of the covered foundation block, and are sewed strongly thereto, in addition to which they may be sewed to each other, thus uniting them into an artificial metacarpus. The middle and ring finger members are placed on top of the block, and are sewed to the covering and through the holes 22. The index and little finger members are placed somewhat lower, against the sides of the block, and are sewed to the sides of the block. The part of the block within the metacarpus is thus completely buried beneath the top and between the sides of the mass formed by the bony cores and fabric wrappings of the metacarpal portions of the finger members. All the sewing must be of the strongest character. The forward end of the block terminates at the base of the digit portions of the four finger members.

The rearwardly projecting ends of the wires 7 are sewed down upon the covering 24 by very heavy stitching 26, which both keeps these ends from doing mischief and serves as a basal anchorage for the skeletal or tendon elements.

The flared metacarpal part of the thumb member 15ª is now placed in position against, over and under, the side of the partially completed metacarpus, and is sewed in a manner to unite it integrally with the structure. One or more finishing layers of felt or the like 27 are then sewed over the palm, and a finishing layer 28 is also preferably sewed on over the basal envelope of the thumb member. These layers conceal the heavy and somewhat clumsy work sewing beneath and increase the fleshiness of these regions.

A heavy tape binding 29 is wound about the rear extremities of the finger members and the adjacent portion of the block, up to the rib 23, covering the projecting wires 26. This tape is wound around and around, pulling it tightly all the while, until a substantial mass has been built up, forming a suitable transition from the wrist to the metacarpus. The finger and thumb members are thereby strongly bound together and to the block, the wire elements are further secured and confined, and the strength of the hand as a whole, and the resistance of its stitching to snapping, are greatly increased. The turns of the binding 29 are sewed together at 30 to keep them from slipping on each other, and the mass is sewed to the body of the metacarpus, at 31, on the one hand, and to the covering of the block, at 32, on the other hand. The rib 22 furnishes a basal abutment preventing any rearward slipping of the mass.

Another tape binding 33, preferably of strip area, is wound about the forward end of the metacarpus, adjacent the bases of the four finger digits, and sewed. This binding materially strengthens the hand against separation of the finger members from the block, contributing in an important manner to the great firmness with which the elements of the artificial metacarpus are knit together.

A stay strip 34 is also preferably looped about the thumb near its junction with the metacarpus, the ends of the stay being sewed to the adjacent portion of the metacarpus. This stay limits outward movement of the thumb, securely bracing it against any undue wrenching which might tend to tear its basal attachment.

Figure 20:
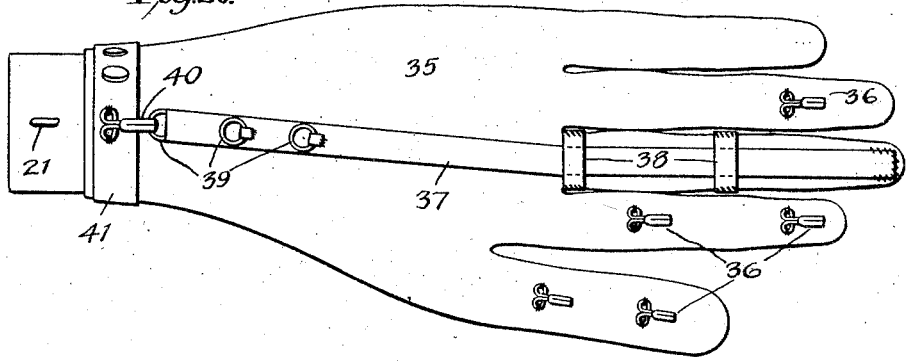
Fig. 20 is a palm view of the hand, inside a glove, which is provided with certain attachments.

The hand is now ready for the glove 35 (Fig. 20). When covered by the glove the hand will be found to have a distinctly lifelike feel and behavior owing to the nature and mode of combination of its elements and materials. The pliant, compound skeletal elements in cooperation with the wrappings, though substantially inelastic and capable of being set in any position, yet have a certain amount of give and return when the hand is grasped and released by a real hand, giving an impression of life. The hand is not clammy, and its bony and fleshy parts are so contrived as to secure a natural condition of firm yieldingness without permanent distortion on the one hand or unnatural elasticity on the other. The hand and its core elements are amply strong for carrying, for holding and using various articles and devices, and for doing many other useful things.

Hooks or the like 36 sewed to the palm side of the fingers and thumb of the glove make it possible to strap certain of the fingers together with elastic bands to aid in holding table implements, a cigarette, cards or other objects.

A stay tape 37 sewed at its forward end at a point near the end of the middle finger of the glove, and passing rearward up the palm side of the finger, beneath keeper loops 38 to an anchorage on the rear part of the hand or glove enables this finger to be positively sustained in a crooked position for lifting, carrying, etc. A similar device may be applied to other of the fingers if desired. The tape is shown provided with eyes 39 at its rear end and at one or more points along its length, to cooperate with a hook 40 on a band 41 secured to the rear end of the glove.

Figure 21:
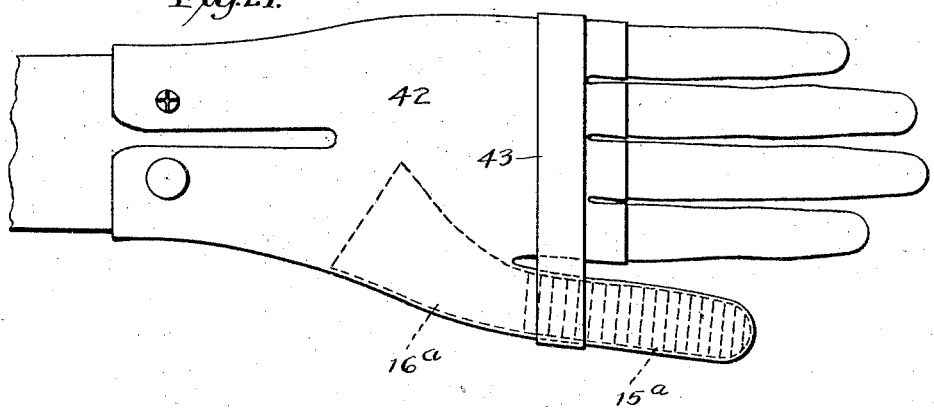
Fig. 21 illustrates the use of a thumb member in connection with a natural hand which has lost its thumb.

A thumb substantially as illustrated in Figs. 9 and 11 is also adapted to be used as a separate article by persons who have lost a thumb from the natural hand. For such purposes the artificial thumb will be slipped into the thumb of a glove 42 or other stall or holder worn or strapped upon the hand. The glove illustrated in Fig. 21 has had its four fingers cut out to leave the real fingers free. By suitably placing a rubber strap or straps about the thumb and the hand or one or more of the natural fingers, it becomes possible to hold a pencil, pen or brush between the natural forefinger and the artificial thumb, or to hold and use other implements. A rubber band 43 is illustrated in this connection, but it will be understood that the arrangement of elastics is a matter for the choice of the user. The winged base of the thumb held about the side of the mutilated metacarpus within the enclosure of the glove affords firm support for the artificial member. The thumb thus applied can be used in playing the piano and in fact for practically any operation in which a natural thumb would be employed. A pencil, pen, or the like to be held in this way may advantageously be wrapped with rubber bands above and below the point of holding, to form enlargements, and also if desired to form a grip where held, to guard against slipping.

While I have described the preferred form of the invention in detail, it will be understood that I do not limit myself to the precise details, and that the principle and the essential features may be embodied with various changes, omissions, substitutions and additions.

What I claim as new is:

1. An artificial hand of the kind described, comprising a foundation block extending in the metacarpal region, and strong and flexible finger members comprising tenacious, pliant cores and strong and compressible fabric wrappings firmly combined, said finger members having metacarpal extensions applied along the block and bound thereto in an artificial metacarpus.

2. An artificial hand of the kind described, comprising a foundation block extending in the metacarpal region, and strong and flexible finger members comprising tenacious, pliant cores and strong and compressible fabric wrappings firmly combined, said finger members having metacarpal extensions applied along the block and bound thereto in an artificial metacarpus, two of the finger members being applied along the top of the block and two others being applied along the sides thereof.

3. An artificial hand of the kind described, comprising a foundation block extending in the metacarpal region, and strong and flexible finger members comprising tenacious, pliant cores and strong and compressible fabric wrappings firmly combined, said finger members having metacarpal extensions applied along the block and secured thereto, together with a binding wrapping about the finger members and the block.

4. An artificial hand of the kind described having elongated strong, flexible, compressible finger members composed of cores and coverings, the rear halves more or less of said finger members being constituted as specified and lying side by side and being united in an artificial metacarpus.

5. An artificial hand of the kind described having elongated strong, flexible, compressible finger members composed of cores and coverings; the rear halves more or less of said finger members being constituted as specified and lying side by side and being united in an artificial metacarpus, together with an artificial thumb of like construction secured to the side of such metacarpus.

6. An artificial hand of the kind described, comprising a foundation block, elongated finger members comprising pliant, tenacious strands and wrappings, the rear halves more or less of the finger members being applied along the block to form an artificial metacarpus, and means securing the rear ends of certain of the strands of the respective finger members to the block.

7. An artificial hand of the kind described, comprising a foundation block, elongated finger members comprising pliant, tenacious strands and wrappings, the rear halves more or less of the finger members being applied along the block to form an artificial metacarpus, means securing the wrappings of the finger members to the block, and means securing the rear ends of certain of the strands of the respective finger members to the block.

8. An artificial hand of the kind described, comprising a covered foundation block, elongated finger members comprising pliant, tenacious strands and wrappings, the rear halves more or less of the finger members being applied along the block to form an artificial metacarpus, stitching uniting the wrappings of the finger members to the block, other stitching securing the rear ends of certain of the strands to the block covering, and a binding wrapping about the finger members and the block.

9. An artificial hand of the kind described, comprising a foundation block having a covering, elongated finger members comprising pliant, tenacious core strands and wrappings, the rear halves more or less of the finger members being constituted as specified and being applied to the block to form an artificial metacarpus, and stitching securing the finger members to the block and its covering.

10. An artificial hand of the kind described, comprising a foundation block, four elongated finger members composed of core strands and wrappings substantially as described, the rear halves more or less of which are applied along the block to form an artificial metacarpus, with a thumb member of similar construction applied at one side of such metacarpus, and the whole firmly united, substantially as described.

11. An artificial hand of the kind described, comprising a foundation block, four elongated finger members composed of core strands and wrappings substantially as described, the rear halves more or less of which are applied along the block to form an artificial metacarpus, with a thumb member of similar construction applied at one side of such metacarpus, and the whole firmly united, said thumb member having basal wings to overlap the metacarpal body at top and bottoms, substantially as described.

12. An artificial hand of the kind described, comprising a foundation block, four elongated finger members composed of core strands and wrappings substantially as described, the rear halves more or less of which are applied along the block to form an artificial metacarpus, with a thumb member of similar construction applied at one side of such metacarpus, and the whole firmly united, said thumb member having a basal envelope formed with wings to overlap the metacarpal body at top and bottom and the rear portions of its core strands being fanned out in said envelope, substantially as described.

13. A construction for digit members of an artificial hand of the character described, comprising a bundle of pliant, tenacious strands forming a core, in combination with a sheath formed by a sheet of felt wrapped about the core, and a spiral wrapping of strong tape wound about the sheath.

14. A construction for digit members of an artificial hand of the character described, comprising a pliant, tenacious core, a flexible, compressible covering, and extra stiffening wires incorporated in the two sides of the artificial digit.

15. A construction for digit members of an artificial hand of the character described, comprising a pliant, tenacious core, a flexible, compressible covering, and extra stiffening wires incorporated in the two sides of the artificial digit, said side wires being continuous with a nail loop or loops at the end of the digit.

16. An artificial digit member having a core made of a bundle of pliant wires, a flexible, compressible covering, and extra stiffening wires incorporated in the two sides of the digit member.

17. An artificial digit member having a core made of a bundle of pliant wires, a flexible, compressible covering, and extra stiffening wires incorporated in the two sides of the digit member and joined at the front by a loop or loops.

18. An artificial digit member, comprising a core comprising a bundle of pliant, tenacious strands, fabric wrappings, and side stiffening wires secured to the wrappings.

19. An artificial digit member, comprising a pliant, tenacious core, a filling about the core, a binding wrapping about the filling, and side stiffening wires incorporated between the filling and binding wrappings.

20. An artificial digit member, comprising a bundle of pliant, tenacious strands, a sheath wrapping about said bundle, a spiral wrapping about the sheath wrapping, and side stiffening wires lying between the wrappings.

21. An artificial digit member, comprising a pliant, tenacious core, a filling wrapping about the core, stiffening wires strongly sewed to the filling wrapping at the two sides, and a binding wrapping over the filling wrapping.

22. An artificial, flexible digit member, characterized by side stiffening wires joined at the front by a nail loop.

23. An artificial hand of the kind described, comprising elongated finger members providing both digit and metacarpal portions, each member formed of a pliant, tenacious core, a flexible, compressible covering, and stiffening side wires incorporated in the member and extending lengthwise of the artificial metacarpus.

24. An artificial hand of the kind described, comprising elongated finger members providing both digit and metacarpal portions, each member formed of a pliant, tenacious core, a flexible, compressible covering, stiffening side wires incorporated in the member and extending lengthwise of the artificial metacarpus, a block providing a foundation for the metacarpus, and means anchoring said stiffening wires to the foundation.

25. In an artificial hand, elongated flexible finger members having their rear halves, more or less, lying side by side and incorporated together in an artificial metacarpus, the said finger members comprising pliant, tenacious cores, filling and binding wrappings, and additional compressible sheaths about the metacarpal portions of the several finger members.

26. A finger member for an artificial hand comprising a digit portion and a metacarpal extension and formed of a core bundle of pliant strands, together with a flexible, compressible covering, and additional side stiffening wires, substantially as described.

27. In an artificial digit, the nail loop formed of wires incorporated in opposite sides of the digit and connected by a projecting curved loop at the end of the digit, substantially as herein described.

28. In an artificial digit, a simulated nail formed of a loop formed of wire members embracing the end of the digit and connected by a curved flattened loop, substantially as described.

29. In a plastic artificial hand of the kind described, having a metacarpus and flexible digit members, the stay loop 34 connecting the thumb digit with the metacarpus.

30. An artificial thumb comprising a bundle of pliant, tenacious strands, a covering, and a flared base.

31. An artificial thumb comprising a bundle of pliant, tenacious strands which are fanned out at the rear to form a flared mat, a spirally wound covering, and an envelope for the flared basal part of the thumb.

HARRIETTE E. HODGSON.